(12) United States Patent
Cichon (10) Patent No.: US 6,489,958 B1
(45) Date of Patent: Dec. 3, 2002

(54) METHOD AND DEVICE FOR GRAPHIC REPRESENTATION OF AN OBJECT DEFINED BY A PLURALITY OF TRIANGLES ON A DISPLAY SURFACE

(75) Inventor: Gordon Cichon, München (DE)

(73) Assignee: SP3D Chip Design GmbH (DE)

( * ) Notice: Subject to any disclaimer, the term of this patent is extended or adjusted under 35 U.S.C. 154(b) by 0 days.

(21) Appl. No.: 09/554,634

(22) PCT Filed: Nov. 18, 1998

(86) PCT No.: PCT/EP98/07387
§ 371 (c)(1),
(2), (4) Date: Jul. 14, 2000

(87) PCT Pub. No.: WO99/26200
PCT Pub. Date: May 27, 1999

(30) Foreign Application Priority Data

Nov. 18, 1997 (DE) .......................................... 197 51 058

(51) Int. Cl.[7] .............................................. G06T 17/00
(52) U.S. Cl. ........................................................ 345/421
(58) Field of Search ............................... 345/418, 419, 345/421, 423, 424, 426, 427

(56) References Cited

FOREIGN PATENT DOCUMENTS

EP            0 740 272 A2     10/1996

OTHER PUBLICATIONS

Wolf–Dietrich Fellner, "Computer Grafik," Wissenschaftsverlag (Germany), p. 230–235 (1988).
Wolf–Dietrich Fellner, "Computer Grafik," Wissenschaftsverlag (Germany), p. 315 (1988).
Foley et al., "Computer Graphics—Principles and Practice," The Systems Programming Series, 2nd ed., Addison–Wesley Publishing Company, p. 806–809 (1990).
Theo Pavlidis, "Algorithmen zur Grafik und Bildverarbeitung," Verlag Heinz Heise GmbH & Co. (Germany), p. 415–420 (1990).
Abi–Ezzi et al., "Factoring A Homogeneous Transformation For A More Efficient Graphics Pipeline," Computers & Graphics, Headington Hill Hall (Great Britian), vol. 15 (No. 2), p. 249–258 (1991).
Bloomenthal et al., "Homogeneous coordinates," The Visual Computer, Springer–Verlag (Canada), p. 15–26 (1994).
Daniel Vanarsdale, "Homogeneous Transformation Matrices For Computer Graphics," Computers & Graphics, vol. 18 (No. 2), p. 177–191 (1994).
Foley et al., "Computer Graphics—Principles and Practice," 2nd ed., Addison–Wesley Publishing Company, p. 279–281, 334–338 (1996).
Foley et al., "Computer Graphics—Principles and Practice," 2nd ed., Addison–Wesley Publishing Company, p. 866–873 (1996).

*Primary Examiner*—Cliff N. Vo
(74) *Attorney, Agent, or Firm*—Patton Boggs LLP (57) ABSTRACT

A device for the graphic representation on a display surface of an object defined by a plurality of triangles which are respectively specified by three points in homogeneous object coordinates comprises a device for transforming the homogeneous object coordinates of the plurality of triangles into homogeneous clip coordinates of a clip coordinate system with an observer standpoint located on an observation axis which is perpendicular to the display surface, a device for determining the position of the observer standpoint in relation to each of the plurality of triangles by determining the orientation of each triangle of the plurality of triangles in the clip coordinate system with repect to the observer standpoint using the homogeneous clip coordinates of the plurality of triangles, a device for marking the position of the observer standpoint in relation to each triangle of the plurality of triangles in association with the homogeneous object coordinates of the plurality of triangles, and a device for processing the triangles specified in the object coordinates using the marked position of the observer standpoint in relation to each triangle so as to graphically represent the object on the display surface.

32 Claims, 5 Drawing Sheets

METHOD AND DEVICE FOR GRAPHIC REPRESENTATION OF AN OBJECT DEFINED BY A PLURALITY OF TRIANGLES ON A DISPLAY SURFACE

FIELD OF THE INVENTION

The present invention relates to computer systems and in particular to graphic processing systems which graphically represent or render on a display surface objects defined in an object coordinate system.

BACKGROUND OF THE INVENTION

Methods for rendering object coordinate system data into screen coordinate system data (screen space data) have been known for some time. A comprehensive description of a known method can be found in the book entitled "Computer Graphics, (Pinciples and Practice", by Foley, van Dam, Feiner, Hughes, published by Addison-Wesley Publishing Company, ISBN 0-201-84840-6. Normally objects are defined by triangles in an object coordinate system or object space. A triangle is defined by its three vertices $P_1$, $P_2$, $P_3$. In the case of a three-dimensional graphic application, each point in the three-dimensional coordinate system requires three coordinate values. The origin of the three-dimensional rectangular coordinate system in the object space or object coordinate system can be chosen at random. If the object to be represented is a sphere, for example, the origin of the object coordinate system is normally located at the centre of the sphere. The representation in the object coordinate system is thus defined from the outset and is independent of an observer standpoint.

An observer should now be able to move through space so as to be able to observe the surfaces defined in the object coordinate system, and thus objects, from his particular standpoint. A simple example should make this clear. Consider a house which has been specified in object coordinates. An observer should now be able to approach this house from e.g. the garden gate, in which case it is clear that he can then only see the facade but not any objects inside the house. Furthermore the observer can only see one side of the house wall, the visible side of the house call being of course the outer side if he is outside the house and the inner wall of a room if he is inside the house. The object coordinate system origin could e.g. be located on the ground floor, so that the cellar of the house will have negative y-coordinates in the object coordinate system while the first floor will have positive y-coordinates. It is therefore necessary to process the polygons, and thus triangles, specified "absolutely" in the object coordinate system in order to represent only what the observer sees on a screen. In addition it is necessary to light or shade the objects in the house in three dimensions. While the light source, e.g. the sun or a lamp in a room, may here be fixed absolutely in object coordinates, the observer will see different lit objects depending on his standpoint.

DESCRIPTION OF PRIOR ART

Figure 4:
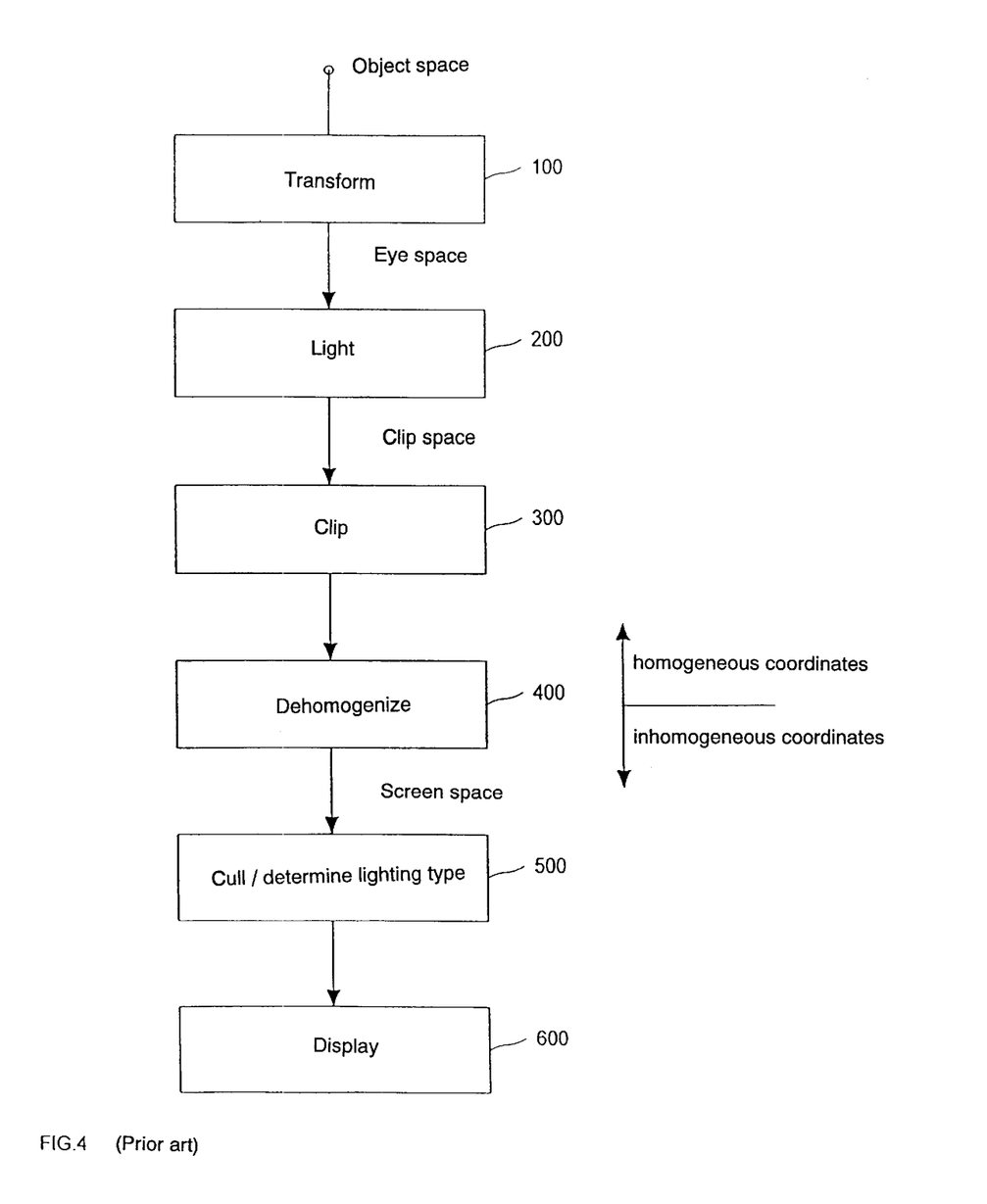
FIG. 4 shows a flowchart for a known method for the graphic representation of a triangle on a screen.

FIG. 4 shows a flowchart of a known method for rendering object coordinate system data so as to be able to display them on a monitor. Such a method is shown in J. D. Foley, A. Van Dam et al., "Computer Graphics", Addison-Wesley, 1996, FIG. 18.3.3.

In a first step 100 the object coordinate system data are transformed into an eye coordinate system or eye space, in which necessary lighting calculations 200 are performed. After the lighting 200 in the eye coordinate system a perspective projection is preferably performed so as to obtain clip coordinates or clip-space coordinates from the original object coordinates. After clipping 300 in the clip coordinate system, the homogeneous clip coordinates are dehomogenized.

In a first step 100 the object coordinate system data are transformed into an eye coordinate system or eye space, in which necessary lighting calculations 200 are performed. After the lighting 200 in the eye coordinate system a perspective projection is preferably performed so as to obtain clip coordinates or clip-space coordinates from the original object coordinates. After clipping 300 in the clip coordinate system, the homogeneous clip coordinates are dehomogenized.

The position of a triangle in the object coordinate system is normally represented redundantly in that the three coordinates of each vertex of the triangle in the coordinate system each has a respective scaling factor assigned to it. In accordance with the technical terminology, an unambiguous representation of points is termed an inhomogeneous representation, whereas an overdetermined or redundant representation of points is termed a homogeneous representation of these points. If a point on a two-dimensional surface is represented by means of two coordinates, this constitutes an inhomogeneous representation of the point. If a point on a two-dimensional surface is represented by means of three coordinates, this representation is overdetermined and is termed a homogeneous representation. By analogy thereto, a point in the three-dimensional coordinate system can be represented in an inhomogeneous way by its x-, y- and z-coordinates if the three-dimensional space is defined by a Cartesian coordinate system. A homogeneous representation of the point in the three-dimensional space is achieved by specifying 4 "coordinates" for the point in the three-dimensional space. The fourth coordinate w is by definition a scaling factor. A homogeneous x-, y-, z-coordinate is converted into an inhomogeneous x-, y- or z-coordinate by dividing by the scaling factor w. If a point in the space has inhomogeneous coordinates (1, 2, 3), its homogeneous representation could be (1, 2, 3, 1) or (2, 4, 6, 2), etc.

The advantage of the homogeneous representation of a point in the space is that all transformations which normally occur in a three-dimensional graphic processing or graphic pipeline (e.g. a translation, a rotation, a scaling and in particular a perspective projection) can be represented as a multiplication of the position of the point with a 4×4 transformation matrix. The coordinates used in the steps 100, 200 and 300 are homogeneous coordinates, which are converted into inhomogeneous coordinates in the dehomogenization step 400. This dehomogenization is effected in a simple way by dividing the homogeneous x-, y-, z-values by the corresponding scaling factor w of this point. After dehomogenization, the talk is of coordinates in the screen coordinate system or screen space. The step 500 is then performed in the screen coordinate system. In this step triangles which do not have the desired orientation are culled. If two-sided lighting is employed, triangles with undesired orientation are not culled but are simply lit differently. The step 500 thus determines the type of lighting to be used for a triangle. In the case of a house where the outer wall is also the inner wall of a room, the outer wall is lit e.g. in yellow, if the house is painted yellow, while the inner wall of the room is lit up in white. Thus if an observer is outside the house, the graphic rendering method determines that only triangular surfaces which represent outer walls, i.e. which have a particular orientation, are to be displayed, while inner walls, i.e. triangular surfaces with opposite orientation, can be ignored. If there is only one type of lighting, the triangular surfaces whose orientation corresponds by definition to an interior orientation, are culled or, in the case of two-sided lighting, are provided with a type of lighting which discloses that what is involved here is a triangular surface which should describe the outer wall of a house.

It should be pointed out here that in the step 200 in the known method all the triangles are lit or both types of lighting are calculated for all triangles in the case of two-sided lighting, although half the triangles are culled again in the step 500 or one of the two types of lighting of a triangle is ignored when the triangles are subsequently displayed on a screen in a step 600.

As an alternative to the prior art described in FIG. 4, triangles can also be lit directly in the object coordinate system, whereupon the lit object coordinate surfaces are transformed directly into the clip coordinate system (clip space) without involving the eye coordinate system. This approach is favourable from the point of view of numerical considerations, since the lit object coordinates can be transformed into the clip coordinate system using a single matrix, this combined transformation matrix resulting from a matrix multiplication of the individual transformation matrices.

Figure 3:
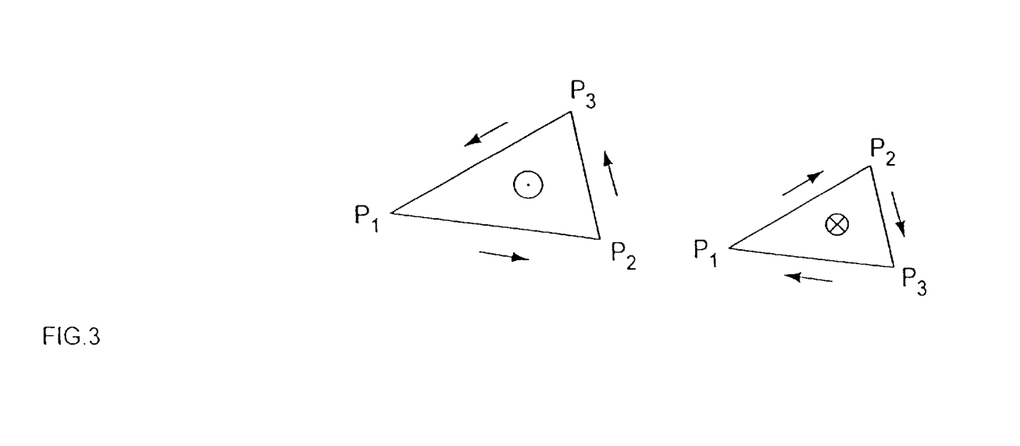
FIG. 3 shows a diagram for explaining the orientation of triangles.

In the following the step 500 of culling triangles with undesired orientation is considered. First of all the orientation of a triangle is determined. FIG. 3 shows two triangles with different orientations. The orientation is determined by the sense of rotation, which results when the first vertex $P_1$ is connected to the second vertex $P_2$ and the second vertex $P_2$ is then connected to the third vertex $P_3$ and the third vertex $P_3$ is then connected to the first vertex $P_1$, as is represented by the arrows in FIG. 3. The left-hand triangle in FIG. 3 then exhibits an orientation out of the plane of the drawing, while the right-hand triangle has an orientation into the plane of the drawing.

It should be noted that this orientation is determined solely by the sequence of the vertices, i.e. can be chosen at will, since a triangle displayed on a screen and having a clockwise orientation cannot be distinguished from a corresponding triangle with a counterclockwise orientation if the triangles have been lit in the same manner. It is therefore e.g. possible, in the example of the house which has been presented, to provide all the outer surfaces of the house with an orientation according to the left-hand triangle of FIG. 3, while all the inner surfaces of the house have an orientation according to the right-hand triangle of FIG. 3. When a graphic rendering method has recognized that an observer is outside the house, it can immediately cull all the triangles with the other orientation since they are, on the basis of their definition, interior triangles.

The determination of the orientation of the surface of a triangle on a display surface thus plays an important role. It is this that determines whether the observer is looking at the front or the back of the triangle. From geometry it is known how to calculate the orientation of a triangle which is spanned by three points in space. This orientation is determined by the sign of the z-coordinate of the normal vector to the surface of the triangle. If the triangle is skewed in space, the normal vector will have a component in the x-direction, a component in the y-direction and a component in the z-direction. If the orientation of a triangle relative to an axis on which the observer finds himself is required, only the component of the normal vector parallel to this axis is needed. In graphic rendering systems the horizontal extension of the screen will normally be parallel to the x-axis and the vertical extension of the screen will normally be parallel to the y-axis. The z-axis, which is perpendicular to the screen or display surface, is then the observation axis. Thus what is needed is the orientation of a triangle relative to this observation axis.

This is given by the z-component of the vector product of the 2 directional vectors which result when the position of one vertex of a triangle is subtracted from the other two vertices. This relationship can be expressed in equational form as follows:

$$a = [(v_2 - v_1) \times (v_3 - v_1)]_z \qquad (1)$$

$$= (x_2 - x_1)(y_3 - y_1) - (y_2 - y_1)(x_3 - x_1) \qquad (2)$$

In this equation $v_1$, $v_2$ and $v_3$ represent the vectors from the origin of the coordinate system to the three vertices of the triangle, i.e. to $P_1$, $P_2$ and $P_3$. $P_1$ is given by $(x_1, y_1)$, $P_2$ is given by $(x_2, y_2)$ and $P_3$ is given by $(x_3, y_3)$. The point coordinates used in the equations (1) and (2) are inhomogeneous coordinates. Unfortunately, however, inhomogeneous coordinates are obtained only after the dehomogenization 400, since the operations performed previously must be performed in homogeneous coordinates, mainly for numerical reasons. This is also the reason why all the existing triangles are lit in step 200, after which each second triangle is culled in step 500, as a result of which a known graphic pipeline expends a great deal of unnecessary processor effort, since in general 50% of the computational effort for calculating the lighting is discarded again further on in the graphic pipeline.

It should be noted that a dehomogenization of the homogeneous coordinates cannot be executed prior to the lighting step since clipping must be performed in homogeneous coordinates. A prerequisite for correct clipping is, however, that the lighting operations are performed previously so as to make colour interpolation possible. These constraints are known to experts in the field and are thus not pursued further here.

To summarize, it can be stated that in a known graphic pipeline, regardless of whether the lighting is performed in the object coordinate system or in the eye coordinate system, there is a considerable unnecessary extra outlay since triangles which are later culled are first lit or because both types of lighting are calculated for each triangle whereas only one type of lighting is later displayed.

EP 0 740 272 A2 discloses a method and a device for the fast rendering of three-dimensional objects. Triangles are originally specified in a model space, which is the reference coordinate system for the graphic data which are finally to be displayed on a screen, which is described by a device space, i.e. by a screen coordinate system. Before transforming the triangles from the model space into the screen space, in which the lighting and clipping take place, the orientation of the triangles with respect to an observation standpoint is determined. To this end a vector, termed the eye vector, is formed by joining a point of the triangle in the model space to the observation point. The normal vector for the triangle is then either read or calculated and the scalar product of the eye vector and the normal vector for the triangle is calculated. This scalar product is calculated in the model coordinate system. Its sign indicates whether a triangle is directed away from the observer or towards the observer. This property of the triangle is stored in a list, which is accessed when the triangles are subsequently rendered so that if triangles which are directed away from the observer standpoint are culled, only those triangles which are directed towards the observer have to be transformed. In other words, only those triangles whose list entry indicates an orientation towards the observation standpoint are transformed from the model coordinate system into the device coordinate system and are there lit and clipped before being displayed on a screen after some further steps.

SUMMARY OF THE INVENTION

It is the object of the present invention to provide a more efficient concept for the graphic representation of a triangle.

In accordance with a first aspect of the present invention, this object is achieved by a device for the graphic representation on a display surface of an object defined by a plurality of triangles which are respectively specified by three points in homogeneous object coordinates, comprising: a device for transforming the homogeneous object coordinates of the plurality of triangles into homogeneous clip coordinates of a clip coordinate system with an observer standpoint located on an observation axis which is perpendicular to the display surface; a device for determining the position of the observer standpoint in relation to each of the plurality of triangles by determining the orientation of each triangle of the plurality of triangles in the clip coordinate system with respect to the observer standpoint using the homogeneous clip coordinates of the plurality of triangles, where the device for determining the position of the observer standpoint in relation to each of the plurality of triangles is designed to execute the following equation to determine the orientations of the triangles:

$$a'=w_1(I_2y_3-I_3y_2)+w_2(I_3y_1-I_1y_3)+w_3(I_1y_2-I_2y_1)$$

where (x1, y1, w1), (x2, y2, w2) and (x3, y3, w3) are homogeneous clip coordinates of the three vertices of the triangle and where the sign of a' indicates which of two orientations with respect to the observer standpoint each triangle has; a device for marking the position of the observer standpoint in relation to each triangle of the plurality of triangles in association with the homogeneous object coordinates of the plurality of triangles; and a device for processing the triangles specified in the object coordinates using the marked position of the observer standpoint in relation to each triangle so as to graphically represent the object on the display surface, where the device for processing is designed to cull the triangles specified in the object coordinate system which are directed away from the observer standpoint.

In accordance with a second aspect of the present invention, this object is achieved by a method for the graphic representation on a display surface of an object defined by a plurality of triangles which are respectively specified by three points in homogeneous object coordinates, comprising the following steps: transforming the homogeneous object coordinates of the plurality of triangles into homogeneous clip coordinates of a clip coordinate system with an observer standpoint located on an observation axis which is perpendicular to the display surface; determining the position of the observer standpoint in relation to each of the plurality of triangles by determining the orientation of each triangle of the plurality of triangles in the clip coordinate system with repect to the observer standpoint using the homogeneous clip coordinates of the plurality of triangles, where the device for determining the position of the observer standpoint in relation to each of the plurality of triangles is designed to execute the following equation to determine the orientations of the triangles:

$$a'=w_1(I_2y_3-I_3y_2)+w_2(I_3y_1-I_1y_3)+w_3(I_1y_2-I_2y_1)$$

where (x1, y1, w1), (x2, y2, w2) and (x3, y3, w3) are homogeneous clip coordinates of the three vertices of the triangle and where the sign of a' indicates which of two orientations with respect to the observer standpoint each triangle has; marking the position of the observer standpoint in relation to each triangle of the plurality of triangles in association with the homogeneous object coordinates of the plurality of triangles; and processing the triangles specified in the object coordinates using the marked position of the observer standpoint in relation to each triangle so as to graphically represent the object on the display surface, where the step of processing comprises the culling of the triangles specified in the object coordinate system which are directed away from the observer standpoint.

The present invention is based on the finding that the culling of triangles or the definitive establishment of the type of lighting for two-sided lighting must be performed before lighting in order to avoid unnecessary lighting calculations. If the culling of triangles is already performed in clip coordinates prior to clipping, then it is also possible when clipping to economize on clipping operations, which in the prior art are also performed on triangles which are subsequently culled and are not displayed on a screen. As can be seen from FIG. 4, culling a triangle prior to lighting or determining the type of lighting for two-sided lighting requires that the determination of the orientation of a triangle be performed using homogeneous coordinates. Until now, however, there has only been an equation for inhomogeneous coordinates.

To enable the determination of the orientation of a triangle to be performed in homogeneous coordinates, the following equation is proposed:

$$a'=w_1(I_2y_3-I_3y_2)+w_2(I_3y_1-I_1y_3)+w_3(I_1y_2-I_2y_1)$$

As can be seen from this equation, homogeneous coordinates (x, y, w) are employed, which are coordinates in the clip coordinate system, where the sign of a' indicates the orientation of the surface of a triangle defined by a point $P_1$, a point $P_2$ and a point $P_3$. In the equation it is assumed that in the clip coordinate system the xy-plane of the clip coordinates is parallel to the display surface while an observer axis, relative to which the orientation of the surface of the triangle is determined, is perpendicular to the display surface, i.e. perpendicular to the xy-plane of the clip coordinate system.

The previous equation thus enables the orientation of a triangle to be determined before it is clipped. Consequently, according to the present invention, triangles with a particular orientation are culled before they have to be lit and clipped. In the case of two-sided lighting the triangles are, according to the present invention, now lit only on the side which is directed towards the observer. This provides the possibility of a more efficient graphic pipeline, wherein culling of triangles with a particular orientation or the side determination for two-sided lighting is carried out before lighting and clipping are necessary.

According to the present invention, therefore, the position of the observer standpoint in relation to each of the plurality of triangles is established at the start of a graphic pipeline by determining the orientation of each triangle in clip-space coordinates. The position of the observer standpoint is then marked in relation to each triangle in association with the homogeneous object coordinates of the plurality of triangles in such a way that the triangles defined in object coordinates can, after marking, be processed in the known manner but with the profound difference from the prior art that only those triangles whose orientation is such that they are to be displayed have to pass through the complete graphic pipeline.

In the case of one-sided lighting, marking ensures that only those triangles which are directed towards the observer standpoint are selected from all the triangles in the object space and these are then lit, transformed into the clip space and clipped.

In the case of two-sided lighting, the type of lighting is, according to the present invention, determined before lighting and possibly before the transformation into the eye coordinate system, in such a way that only one lighting operation has to be performed for each triangle, namely for that side of the triangle which has to be used for the display, i.e. that side of the triangle which is directed towards the observer.

Concerning the culling of triangles of a particular orientation, the method and devices of the present invention provide the possibility that, seen statistically, only half of all triangles have to be lit and clipped, which results in an increase in efficiency of 50% as regards lighting and clipping. In the case of two-sided lighting, only one lighting calculation has to be performed for each triangle instead of two lighting calculations for each triangle as On the prior art, which also, seen statistically, brings with it an increase in performance of 50% for the lighting processor.

From the short description of the present invention given above it is clear that the further steps for representing a triangle after orientation determination and culling or single-sided lighting are not essential to the present invention and can be carried out in any known way. Thus lighting can take place optionally in the object coordinate system or, after a transformation into the eye coordinate system, in this coordinate system.

BRIEF DESCRIPTION OF THE DRAWINGS

Preferred embodiments of the present invention are discussed in more detail below making reference to the enclosed drawings, in which

FIG. 1b shows a more detailed representation of the processing from FIG. 1a;

DETAILED DESCRIPTION OF PREFERRED EMBODIMENTS

Figure 1A:
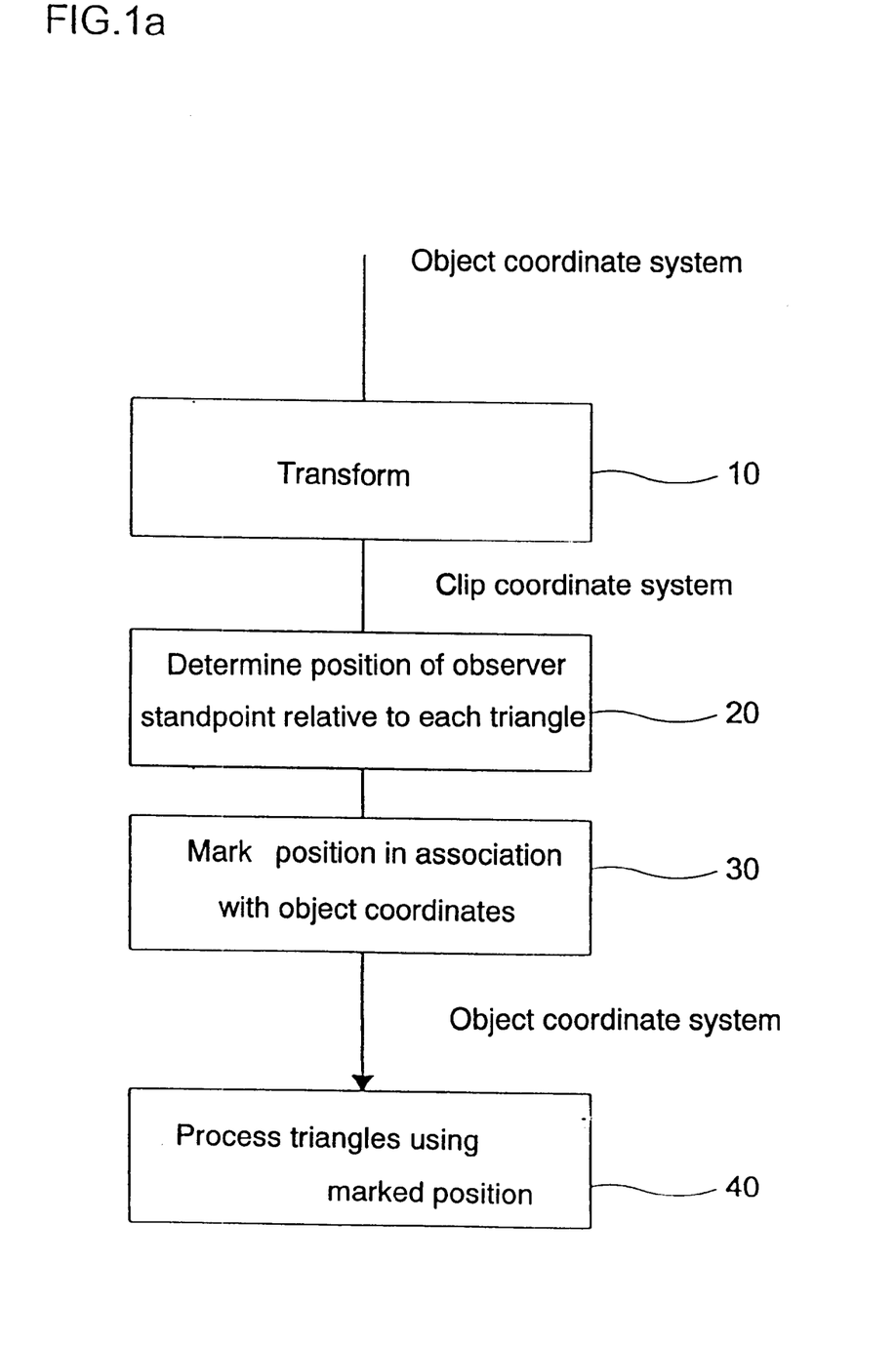
FIG. 1a shows a general flowchart for the present invention.

FIG. 1a shows a schematic flowchart for the graphic representation on a display surface of an object defined by a plurality of triangles which are specified by three vertices in homogeneous coordinates in an object coordinate system. Firstly the object coordinates of the corresponding points are transformed in a known manner into the clip coordinate system (10). In the clip coordinate system the position of an observer standpoint is then established in relation to each of the plurality of triangles by determining the orientation in the clip coordinate system with respect to the observer standpoint (20). The position of each triangle is then marked in association with the object coordinates of the triangles (30). Subsequently the triangles are processed on the basis of this marked position (40).

According to a first aspect of the present invention, a triangle whose orientation differs from the desired one is culled (41, FIG. 1b) before being lit.

Figure 1B:
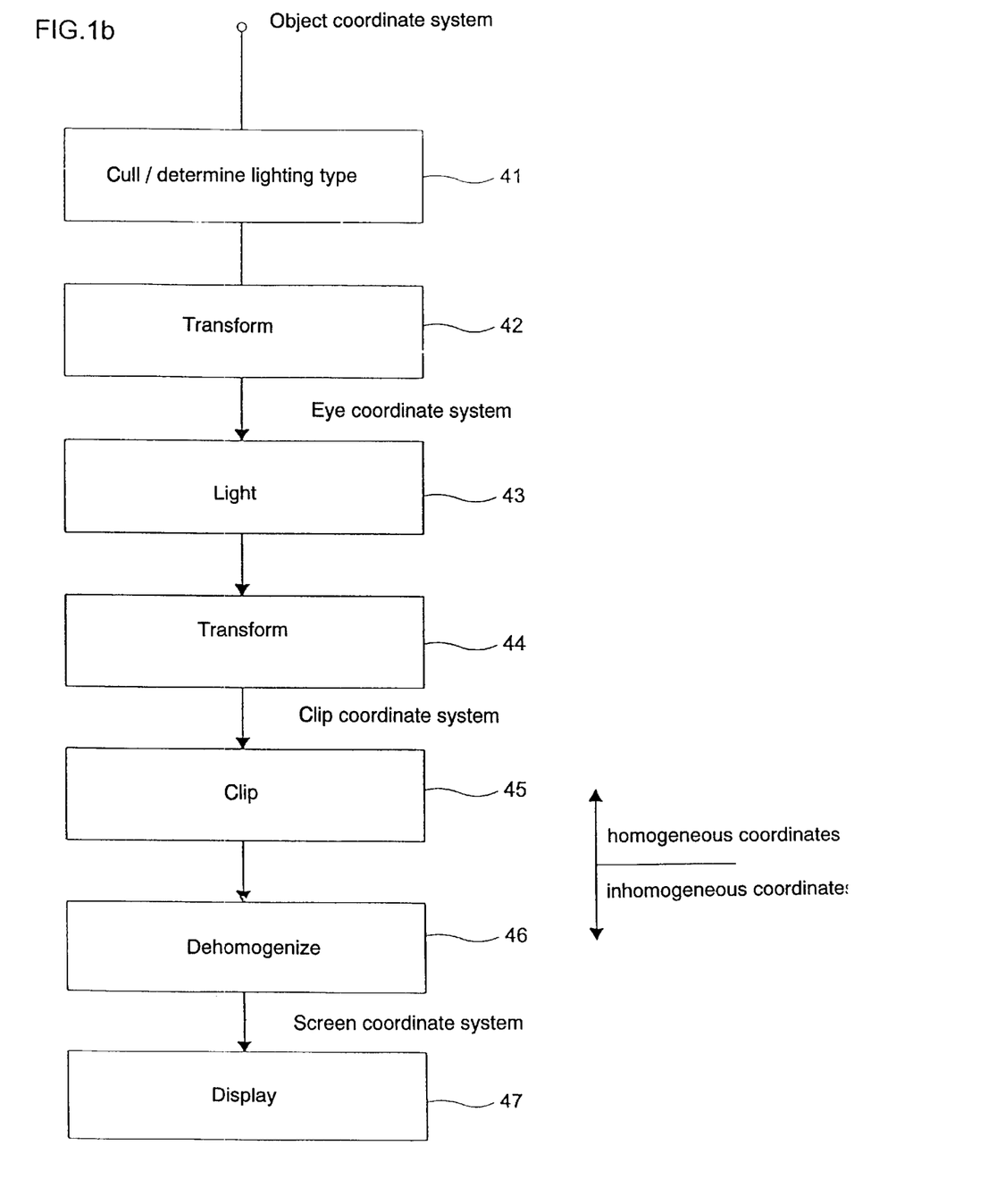

According to a second aspect of the present invention, where two-sided lighting is performed, which side of a triangle will finally be seen on the display surface is already determined here (41, FIG. 1b).

FIG. 1b shows a more detailed representation of the subfeatures which can be executed by the device for processing on the basis of the marked position. Culling or determining the type of lighting (41) at this early stage with homogeneous coordinates is the crucial factor enabling the method according to the present invention to require considerably less processor effort than the known method. In the case of two-sided lighting it is now possible to perform just one lighting calculation for a triangle displayed on the display surface since it is already determined prior to lighting which side of the triangle is directed towards the observer.

After culling or determining the type of lighting (41), the triangles to be displayed or only those sides of them which are to be displayed can then be transformed into the eye coordinate system (42), after which they are lit (43) and, after transformation (44) into the clip coordinate system, the lit triangles are clipped (45). After clipping (45), the still homogeneous point coordinates of the triangles are dehomogenized (46), after which they are present in the screen coordinate system, and are displayed on a display surface and preferably on a screen (47) following a simple transformation into pixel coordinates.

It should be noted here that, if lighting is performed in object coordinates, the transformation (42) prior to lighting can of course be dispensed with. The transformation of the lit triangles into the clip coordinate system then takes place using a transformation matrix which is a multiplication of the transformation matrices of the transformations 42 and 44. This transformation matrix is identical to the transformation matrix which is employed for transforming (10, FIG. 1a) all the triangles into the clip space so as to obtain their position in relation to the observer standpoint.

The transformation matrix for transforming the lit triangles must, however, according to the present invention, only transform those triangles from the object coordinate system into the clip coordinate system whose orientation is such that they are candidates for display.

It can be seen from FIGS. 1a and 1b that culling or determining the type of lighting (20) is performed in homogeneous coordinates and not in inhomogeneous coordinates as in the prior art. Inhomogeneous coordinates are not there calculated until after clipping.

Figure 2:
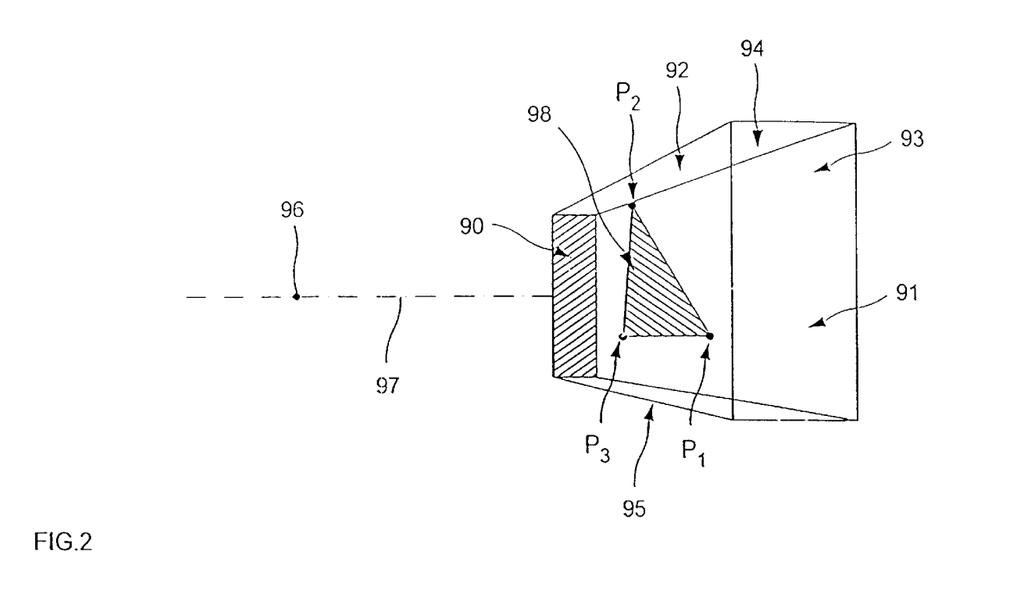
FIG. 2 shows an illustration of the situation in the clip coordinate system.

In the following the way in which culling or determining the type of lighting by determining the orientation of a triangle using homogeneous coordinates is described in detail making reference to FIG. 2. FIG. 2 shows a triangle in the three-dimensional space and defined by the following homogeneous coordinates:

$$v_1 = \begin{pmatrix} x_1 \\ y_1 \\ z_1 \\ w_1 \end{pmatrix}, \quad v_2 = \begin{pmatrix} x_2 \\ y_2 \\ z_2 \\ w_2 \end{pmatrix}, \quad v_3 = \begin{pmatrix} x_3 \\ y_3 \\ z_3 \\ w_3 \end{pmatrix} \quad (3)$$

The triangle is normally clipped in several clip planes. Each clip plane can cut off a piece of the triangle. In the case of a perspective projection, e.g. truncated pyramid (frustum) clipping, a clip volume is defined by a truncated pyramid, as is shown in FIG. 2. The truncated pyramid has a near plane 90, a far plane 91, a left plane 92, a right plane 93, an upper plane 94 and a lower plane 95. The designations upper, lower, left, right, near and far are defined with respect to an observer standpoint 96 located on an observation axis 97 which is perpendicular to the near plane 90. The near plane plays a special role here since it removes points behind the observer, i.e. on the side which is opposite to that of the near plane with respect to the observer standpoint 96, which would be reflected into the clip volume if a dehomogenization of unclipped coordinates were to be executed.

This situation can be explained briefly as follows. The representation in homogeneous coordinates is a redundant representation. A point (1, 0, 0) in inhomogeneous coordinates could be represented by a point (1, 0, 0, 1) or a point (−1, 0, 0, −1) in homogeneous coordinates. Since w no longer exists after dehomogenization, however, the sign of w gets lost.

As is also apparent from FIG. 2, the near plane removes not only the points behind the observer but also points between the observer 96 and the near plane 90 if an application is chosen in which the observer is to be at a certain distance from objects in the space. FIG. 2 shows a case where the triangle 98 is completely behind the near plane 90. However, it is also possible to envisage the case where the observer standpoint 96 either concides with the near plane 90 or where a point of some triangle is located between the observer standpoint 96 and the near plane 90 or behind the observer 96. In particular it is necessary to consider the case where a point is located behind the observer, since otherwise the undesired reflection described above would occur.

A triangle will now be considered for which at least one point ($P_1$) is located behind the near plane 90, i.e. on the side of the near plane 90 opposite to that of the observer standpoint 96. If a point $P_2$, which is specified by a vector $v_2$, is located in front of the near plane 90, a new vertex $v'_2$ is calculated which is the point of intersection of a line between $v_1$ and $v_2$ and the near plane 90. The new vertex $v'_2$ therefore lies in the near plane 90. Expressed in the form of an equation, this point $v'_2$ may be calculated as follows:

$$v'_2 = v_1 + t_2(v_2 - v_1), \quad t_2 \in (0,1). \quad (4)$$

If $v_2$ is behind the near plane, $t_2=1$, which corresponds to the simple case shown in FIG. 2. In the same way if the third point $P_3$ lies between the observer standpoint 96 and the near plane 90 it can be replaced by a point $v'_3$ which lies in the near plane 90. The coordinates of the point $v'_3$ are then as follows:

$$v'_3 = v_1 + t_3(v_3 - v_1), \quad t_3 \in (0,1). \quad (5)$$

The new triangle ($v_1$, $v'_2$, $v'_3$) thus lies behind the near plane and is also part of the polygon obtained by clipping the triangle ($v_1$, $v_2$, $v_3$). This means that the new or auxiliary triangle can be used to determine the orientation of the original triangle ($v_1$, $v_2$, $v_3$) even if one or two vertices of the original triangle lie in front of the near plane 90 or behind the observer standpoint 96. The z-component of the normal vector to the auxiliary triangle ($v_1$, $v'_2$, $v'_3$), which is parallel to the observational axis 97 and which indicates the orientation of this triangle, can be obtained in terms of homogeneous coordinates as follows:

$$a = \left(\frac{x'_2}{w'_2} - \frac{x_1}{w_1}\right)\left(\frac{y'_3}{w'_3} - \frac{y_1}{w_1}\right) - \left(\frac{y'_2}{w'_2} - \frac{y_1}{w_1}\right)\left(\frac{x'_3}{w'_3} - \frac{x_1}{w_1}\right) \quad (6)$$

$$= \left(\frac{x_1 + t_2(x_2 - x_1)}{w_1 + t_2(w_2 - w_1)} - \frac{x_1}{w_1}\right)\left(\frac{y_1 + t_3(y_3 - y_1)}{w_1 + t_3(w_3 - w_1)} - \frac{y_1}{w_1}\right) - \quad (7)$$
$$\left(\frac{y_1 + t_2(y_2 - y_1)}{w_1 + t_2(w_2 - w_1)} - \frac{y_1}{w_1}\right)\left(\frac{x_1 + t_3(x_3 - x_1)}{w_1 + t_3(w_3 - w_1)} - \frac{x_1}{w_1}\right)$$

In equation (7) there appear only homogeneous coordinates of the original triangle and the parameters $t_2$ and $t_3$ obtained by clipping with the near plane 90. Since what is to be calculated is not the surface of a triangle as such but simply the orientation of the z-component of the normal vector to the triangle, it is not necessary to solve equation (7) completely but just to establish the sign of a. To do this, all the positive factors can be divided out of equation (7), which has been carried out in the following equations (8) and (9).

$$\underbrace{a}_{>0} \underbrace{w_1^2}_{>0} \underbrace{(w_1 + t_2(w_2 - w_1))(w_1 + t_3(w_3 - w_1))}_{>0} \quad (8)$$
$$= (w_1(x_1 + t_2(x_2 - x_1)) - x_1(w_1 + t_2(w_2 - w_1))) \cdot$$
$$\quad (w_1(y_1 + t_3(y_3 - y_1)) - y_1(w_1 + t_3(w_3 - w_1))) -$$
$$\quad (w_1(x_1 + t_3(x_3 - x_1)) - x_1(w_1 + t_3(w_3 - w_1))) \cdot$$
$$\quad (w_1(y_1 + t_2(y_2 - y_1)) - y_1(w_1 + t_2(w_2 - w_1)))$$

$$= \underbrace{w_1}_{>0} \underbrace{t_2}_{>0} \underbrace{t_3}_{>0} \cdot \quad (9)$$
$$(w_1(x_2 y_3 - x_3 y_2) +$$
$$w_2(x_3 y_1 - x_1 y_3) +$$
$$w_3(x_1 y_2 - x_2 y_1))$$

It should be noted that the equations (6) to (9) relate only to triangles which lie in part in front of the observer standpoint 96. This means that at least one vertex has a positive homogeneous coordinate w. In the perspective projection, which is preferably situated in the transformation step 10, the x- and y-coordinates of a point are, as is known, divided by the coordinate z. The result is that triangles which are further away from the observer also seem smaller since they are "further back". A perspective projection matrix copies the z-value of its input vector into the w-value of its output vector while taking account of appropriate scalings. Thus points behind the observer always have a negative value w while points in front of the observer always have a positive value w.

When account is taken of the fact that all the corresponding terms in the equations (8) and (9) have positive values, the following equation is obtained for determining the orientation of a triangle with vertices in homogeneous coordinates:

$$a' = w_1(l_2 y_3 - l_3 y_2) + w_2(l_3 y_1 - l_1 y_3) + w_3(l_1 y_2 - l_2 y_1) \quad (10)$$

From this equation it can be seen that the clipping parameters $t_1$ and $t_2$ have disappeared again. This is not surprising, since clipping does not in itself alter the orientation of the triangle, since the auxiliary triangle was part of the original triangle and the normal vector of the auxiliary triangle is thus always parallel to the normal vector of the complete triangle from which the auxiliary triangle resulted. Equation (10) also shows that the present invention is not restricted to the case of frustum clipping but is universally applicable as equation (10) does not contain any information on the clip volume. The case of frustum clipping is simply one easily visualized case among many for explaining the present invention.

Figure 5:
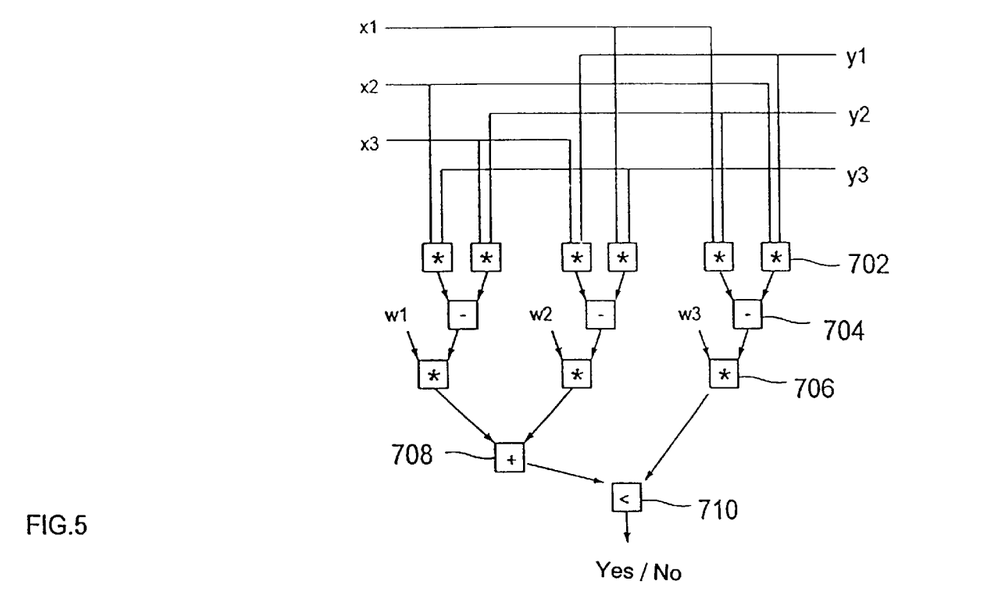
FIG. 5 shows a circuit for calculating an equation for determining the orientation of a triangle by means of homogeneous coordinates.

FIG. 5 shows an embodiment of a hard wired circuit for calculating the orientation of a triangle specified in homogeneous coordinates. The circuit according to the present invention is able to determine the sign of a' in equation (10) very quickly. The circuit has six multipliers 702 for executing the multiplications of the relevant coordinate pairs. In addition the circuit has three subtracters 704 for executing the subtractions indicated an equation (10). The results from the subtracters are then multiplied by the corresponding w-coordinates by means of three multipliers 706. An adder 708 forms the sum of the first two terms and a comparator 710 compares this sum with the result from the right multiplier. If the comparator delivers a "YES", i.e. if the result from the adder 708 is smaller than the result from the right multiplier 706, this means that the points in the object coordinate system are arranged clockwise. If the comparator delivers a "NO" on the other hand, the points in the object coordinate system are arranged anticlockwise. Through cyclic exchange of x, y and w at the inputs of the circuit the orientation of a triangle can be calculated with respect to an axis other than the z-axis.

To improve the efficiency still further, triangles whose three vertices all lie outside the clip volume are preferably excluded from the calculation. This process is called "trivial clipping". Such triangles can thus also be recognized before lighting and culled so as to further reduce the processor effort for graphic processing devices.

In trivial clipping the side planes of the observation volume are considered individually. If all three vertices of a triangle lie outside a particular plane, the triangle lies completely outside the observation volume. The fact that all the vertices lie outside different planes is not of itself a sufficient criterion. This can be seen by considering e.g. a triangle which intersects an observation volume. If e.g. two points lie to the right of the right plane and one point lies to the left of the left plane, it is possible for the triangle to be visible although not a single vertex is visible. If, however, all three points were to lie to the right of the right plane, the triangle would not be visible. Such triangles are preferably culled by trivial clipping before calculating the orientation of triangles.

To summarize, it can be stated that equation (10) enables the orientation of a triangle in homogeneous coordinates to be calculated. As a result it is no longer necessary to wait until clipping and lighting have been performed before determining the orientation of the triangles. According to the present invention culling or establishing the type of lighting in the event of two-sided lighting is already performed prior to lighting and clipping, which, from a statistical point of view, enables the clipping operations or the lighting operations to be reduced by 50%.

What is claimed is:

1. A device for the graphic representation on a display surface of an object defined by a plurality of triangles which are respectively specified by three points in homogeneous object coordinates, comprising the following features:

a device for transforming the homogeneous object coordinates of the plurality of triangles into homogeneous clip coordinates of a clip coordinate system with an observer standpoint located on an observation axis which is perpendicular to the display surface;

a device for determining the position of the observer standpoint in relation to each of the plurality of triangles by determining the orientation of each triangle of the plurality of triangles in the clip coordinate system with respect to the observer standpoint using the homogeneous clip coordinates of the plurality of triangles;

a device for marking the position of the observer standpoint in relation to each triangle of the plurality of triangles in association with the homogeneous object coordinates of the plurality of triangles; and a device for processing the triangles specified in the object coordinates using the marked position of the observer standpoint in relation to each triangle so as to graphically represent the object on the display surface.

2. A device according to claim 1 wherein the device for processing comprises the following features:

a device for culling the triangles specified in the object coordinate system which are directed away from the observer standpoint using the marked position;

a device for transforming only the unculled triangles into an eye coordinate system which is isometric to the object coordinate system; and a device for lighting the triangles transformed into the eye coordinate system.

3. A device according to claim 1 wherein the device for processing comprises the following features:

a device for culling the triangles specified in the object coordinate system which are directed away from the observer standpoint using the marked position; and a device for lighting only the unculled triangles in the object coordinate system.

4. A device according to claim 1 wherein the device for processing comprises the following features:

a device for determining the type of lighting of each triangle in the case of two-sided lighting on the basis of the marked position of the observer standpoint in relation to each triangle in such a way that the type of lighting is determined only for the side of a triangle which is directed towards the observer standpoint;

a device for transforming the plurality of triangles into an eye coordinate system which is isometric to the object coordinate system; and a device for lighting the transformed triangles using the determined type of lighting in such a way that only the side of a triangle of the plurality of triangles which is directed towards the observer is lit.

5. A device according to claim 1 wherein the device for processing comprises the following features:

a device for determining the type of lighting of each triangle in the case of two-sided lighting on the basis of the marked position of the observer standpoint in relation to each triangle in such a way that the type of lighting is determined only for the side of a triangle which is directed towards the observer standpoint; and a device for lighting the triangles in object coordinates using the determined type of lighting in such a way that only the side of a triangle of the plurality of triangles which is directed towards the observer is lit.

6. A device according to claim 1 wherein the device for processing also comprises the following features:

a device for transforming the lit triangles into the clip space; and a device for clipping the triangles transformed into the clip space.

7. A device according to claim 1 wherein the device for transforming the homogeneous object coordinates of the plurality of triangles into the homogeneous clip coordinates comprises a transformation matrix which is the result of a multiplication of a first transformation matrix, for a transformation from the object coordinate system into an eye coordinate system which is isometric to the object coordinate system and in which lighting can take place, and a second transformation matrix from the eye coordinate system into the clip coordinate system.

8. A device according to claim 1 wherein the device for determining the position of the observer standpoint in relation to each of the plurality of triangles is able to execute the following equation to determine the orientations of the triangles:

$$a' = w_1(x_2 y_3 - x_3 y_2) + w_2(x_3 y_1 - x_1 y_3) + w_3(x_1 y_2 - x_2 y_1)$$

where (x1, y1, w1), (x2, y2, w2) and (x3, y3, w3) are homogeneous clip coordinates of the three vertices of the triangle and where the sign of a' indicates which of two of orientations with respect to the observer standpoint each triangle has.

9. A device according to claim 1, which also comprises the following feature:
   a device preceding the device for determining which establishes whether all the vertices of a triangle lie outside a plane of the clip volume which selects the points displayed on the display surface, the triangle being culled if all the vertices lie outside a plane of the clip volume.

10. A device according to claim 1 wherein the device for determining comprises the following features:
   a device for defining a plane which is perpendicular to the observer axis and which is situated at a distance from the observer standpoint on the observer axis;
   a device for determining whether a first vertex of a triangle is located behind the observation plane with respect to the observer standpoint;
   a device for finding the point of intersection with the plane of the line connecting a second vertex of the triangle, which is located between the observer standpoint and the plane, and the first vertex if a first vertex of the triangle is located behind the observation plane with respect to the observer standpoint;
   a device for finding the point of intersection with the plane of the line connecting a third vertex of the triangle and the first vertex if the third vertex also lies between the observer standpoint and the plane; and
   a device for calculating the sign of the component, perpendicular to the observation plane, of the normal vector to the surface of an auxiliary triangle which is defined by the intersection points calculated by the two above-recited devices for finding the point of intersection and the first vertex, the sign indicating the orientation of the triangle.

11. A device according to claim 1, which is so designed that the orientation of each triangle in the object coordinate system is predetermined by a sense of rotation which results when the first vertex is connected to the second vertex, the second vertex is connected to the third vertex and the third vertex is connected to the first vertex.

12. A device according to claim 1, which is so designed that the object is a three-dimensional body, the orientation of each triangle indicating whether the triangle is part of an outer or inner boundary of the body.

13. A device according to claim 1 wherein the device for transforming is designed to perform a rotation, a translation, a scaling and a perspective projection of the triangle, all these operations being executed in homogeneous coordinates.

14. A device according to claim 6 wherein the device for processing also comprises the following features:
   a device for dehomogenizing the homogeneous coordinates of each clipped triangle so as to obtain inhomogeneous coordinates for vertices of the clipped triangles;
   a device for converting the inhomogeneous coordinates into display surface coordinates; and
   a device for displaying the clipped triangles on the display surface.

15. A device according to claim 14 wherein the display surface is a monitor and the display surface coordinates are pixel coordinates of the monitor and where the origin of the pixel coordinate system is located in the middle of the monitor and where the observer axis passes through this origin and is also perpendicular to the pixel coordinate system.

16. A method for the graphic representation on a display surface of an object defined by a plurality of triangles which are respectively specified by three points in homogeneous object coordinates, comprising the following steps:
   transforming the homogeneous object coordinates of the plurality of triangles into homogeneous clip coordinates of a clip coordinate system with an observer standpoint located on an observation axis which is perpendicular to the display surface;
   determining the position of the observer standpoint in relation to each of the plurality of triangles by determining the orientation of each triangle of the plurality of triangles in the clip coordinate system with repect to the observer standpoint using the homogeneous clip coordinates of the plurality of triangles;
   marking the position of the observer standpoint in relation to each triangle of the plurality of triangles in association with the homogeneous object coordinates of the plurality of triangles; and
   processing the triangles specified in the object coordinates using the marked position of the observer standpoint in relation to each triangle so as to graphically represent the object on the display surface.

17. A method according to claim 16 wherein the step of processing comprises the following steps:
   culling the triangles specified in the object coordinate system which are directed away from the observer standpoint using the marked position;
   transforming only the unculled triangles into an eye coordinate system which is isometric to the object coordinate system: and
   lighting the triangles transformed into the eye coordinate system.

18. A method according to claim 16 wherein the step of processing comprises the following steps:
   culling the triangles specified in the object coordinate system which are directed away from the observer standpoint using the marked position; and
   lighting only the unculled triangles in the object coordinate system.

19. A method according to claim 16 wherein the step of processing comprises the following steps:
   in the case of two-sided lighting, determining the type of lighting of each triangle on the basis of the marked position of the observer standpoint in relation to each triangle in such a way that the type of lighting is determined only for the side of a triangle which is directed towards the observer standpoint;

transforming the plurality of triangles into an eye coordinate system which is isometric to the object coordinate system; and lighting the transformed triangles using the determined type of lighting in such a way that only the side of a triangle of the plurality of triangles which is directed towards the observer is lit.

20. A method according to claim 16 wherein the step of processing comprises the following substeps:

in the case of two-sided lighting, determining the type of lighting of each triangle on the basis of the marked position of the observer standpoint in relation to each triangle in such a way that the type of lighting is determined only for the side of a triangle which is directed towards the observer standpoint; and lighting the triangles in object coordinates using the determined type of lighting in such a way that only the side of a triangle of the plurality of triangles which is directed towards the observer is lit.

21. A method according to claim 16 wherein the step of processing also comprises the following steps:

transforming the lit triangles into the clip space; and clipping the triangles transformed into the clip space.

22. A method according to claim 16 wherein in the step of transforming the homogeneous object coordinates of the plurality of triangles into the homogeneous dip coordinates a transformation matrix is used which is the result of a multiplication of a first transformation matrix, for a transformation from the object coordinate system into en eye coordinate system which is isometric to the object coordinate system and in which lighting can take place, and a second transformation matrix from the eye coordinate system into the dip coordinate system.

23. A method according to claim 16 wherein the step of determining the position of the observer standpoint in relation to each of the plurality of triangles executes the following equation to determine the orientations of the triangles:

$$a' = w_1(x_2 y_3 - x_3 y_2) + w_2(x_3 y_1 - x_1 y_3) + w_3(x_1 y_2 - x_2 y_1)$$

where (x1, y1, w1), (x2, y2, w2) and (x3, y3, w3) are homogeneous clip coordinates of the three vertices of the triangle and where the sign of a' indicates which of two orientations with respect to the observer standpoint each triangle has.

24. A method according to claim 16, which also comprises the following step:

a step, preceding the step of determining, which establishes whether all the vertices of a triangle lie outside a plane of the clip volume which selects the points displayed on the display surface, the triangle being culled if all the vertices lie outside a plane of the clip volume.

25. A method according to claim 16 wherein the step of determining comprises the following steps:

defining a plane which is perpendicular to the observer axis and which is situated at a distance from the observer standpoint on the observer axis;

determining whether a first vertex of a triangle is located behind the observation plane with respect to the observer standpoint;

finding the point of intersection with the plane of the line connecting a second vertex of the triangle, which is located between the observer standpoint and the plane, and the first vertex if a first vertex of the triangle is located behind the observation plane with respect to the observer standpoint;

finding the point of intersection with the plane of the line connecting a third vertex of the triangle and the first vertex if the third vertex also lies between the observer standpoint and the plane; and calculating the sign of the component, perpendicular to the observation plane, of the normal vector to the surface of an auxiliary triangle which is defined by the intersection points calculated by the two above-recited devices for finding the point of intersection and the first vertex, the sign indicating the orientation of the triangle.

26. A method according to claim 16, which is so executed that the orientation of each triangle in the object coordinate system is predetermined by a sense of rotation, which results when the first vertex is connected to the second vertex, the second vertex is connected to the third vertex and the third vertex is connected to the first vertex.

27. A method according to claim 16, which is so executed that the object is a three-dimensional body, the orientation of each triangle indicating whether the triangle is part of an outer or inner boundary of the body.

28. A method according to claim 16 wherein the step of transforming comprises a rotation, a translation, a scaling and a perspective projection of the triangle, all these operations being executed in homogeneous coordinates.

29. A method according to claim 22 wherein the step of processing also comprises the following steps:

dehomogenizing the homogeneous coordinates of each clipped triangle so as to obtain inhomogeneous coordinates for vertices of the clipped triangles;

converting the inhomogeneous coordinates into display surface coordinates; and displaying the clipped triangles on the display surface.

30. A method according to claim 29 wherein the display surface is a monitor and the display surface coordinates are pixel coordinates of the monitor and where the origin of the pixel coordinate system is located in the middle of the monitor and where the observer axis passes through this origin and is also perpendicular to the pixel coordinate system.

31. A circuit for determining the orientation of a triangle in homogeneous clip coordinates by means of the following equation:

$$a' = w_1(x_2 y_3 - x_3 y_2) + w_2(x_3 y_1 - x_1 y_3) + w_3(x_1 y_2 - x_2 y_1)$$

where (x1, y1, w1), (x2, y2, w2) and (x3, y3, w3) are the homogeneous clip coordinates of the three vertices of the triangle and where the sign of a' indicates which of two orientations with respect to the observer standpoint the triangle has, the observer axis being perpendicular to a plane defined by the x- and the y-coordinate axis.

32. A circuit according to claim 31, which also comprises the following features:

a plurality of first multipliers for calculating the products of individual clip coordinates, where two coordinates with different indices can be multiplied together in each case;

a plurality of subtracters for calculating the difference between two products with opposite coordinate and opposite index in each case;

a plurality of second multipliers for multiplying the subtracter results and the corresponding third coordinates;

an adder for adding the results of two multipliers of the plurality of second multipliers; and a comparator for comparing the result of the adder with the result of the multiplier of the plurality of second multipliers whose result was not added by the adder.

* * * * *